United States Patent [19]

Stanchak et al.

[11] Patent Number: 4,742,959

[45] Date of Patent: May 10, 1988

[54] SNOW GUN

[75] Inventors: Yaroslav I. Stanchak, Bethel; Niilo J. Makkonen, Bridgewater Corners; Victor Waryas, Pittsfield, all of Vt.

[73] Assignee: Killington Ltd., Killington, Vt.

[21] Appl. No.: 933,227

[22] Filed: Nov. 20, 1986

[51] Int. Cl.[4] .......................... F25C 3/04; A01G 15/00

[52] U.S. Cl. .................................... 239/14.2; 239/417

[58] Field of Search ........................ 239/14.2, 2.2, 417; 417/183

[56] References Cited

U.S. PATENT DOCUMENTS 3,908,903 11/1975 Burns, Jr. .......................... 239/14.2

FOREIGN PATENT DOCUMENTS 932770 8/1973 Canada .............................. 239/14.2

*Primary Examiner*—Andres Kashnikow
*Assistant Examiner*—Karen B. Merritt
*Attorney, Agent, or Firm*—McCormick, Paulding & Huber

[57] ABSTRACT

A nozzle structure for mixing high pressure water with compressed air has an adjustable size conically shaped water opening that permits a conical sheet of water to form the air nozzle adjacent the nozzle's exit end.

16 Claims, 3 Drawing Sheets

SNOW GUN

This invention relates generally to nozzle structures for producing snow from a mixture of water and air supplied to the nozzle under pressure. More particularly, the present invention relates to an improved nozzle structure which is provided with water under relatively high pressure, and which is designed to utilize the water to define the air nozzle itself so that less compressed air is required to produce the moisture laden spray of small uniformly sized water particles ejected from the nozzle structure into the ambient air than has been possible with prior art snow guns.

The nozzle structure in its presently preferred form includes a convergent nozzle member having an inlet end adapted for connection to a source of air under pressure and having an outlet that cooperates with a nozzle cap that is adjustably positioned axially relative to the nozzle member to define an inclined conically shaped water opening between the upstream end of the cap and the downstream end of the nozzle member. The cap has an exit end of cross sectional area significantly less than the cross sectional area of the inlet end of the nozzle member, and this area ratio is preferably on the order of 4 to 1. Water pressure provided to an annularly shaped plenum chamber defined between the nozzle member and an outer housing or body is preferably in the range between 250 to 400 pounds per square inch gage. Air pressure is made available to the nozzle at approximately 50-100 pounds per square inch and the geometry is such that increasing water flows at pressures in this range can achieve reduced air flows and the economies achieved are quite significant because of the expense involved in providing compressed air as opposed to providing water under pressure to snow nozzles in a large snow making system of the type employed at present day major ski areas.

Figure 1:
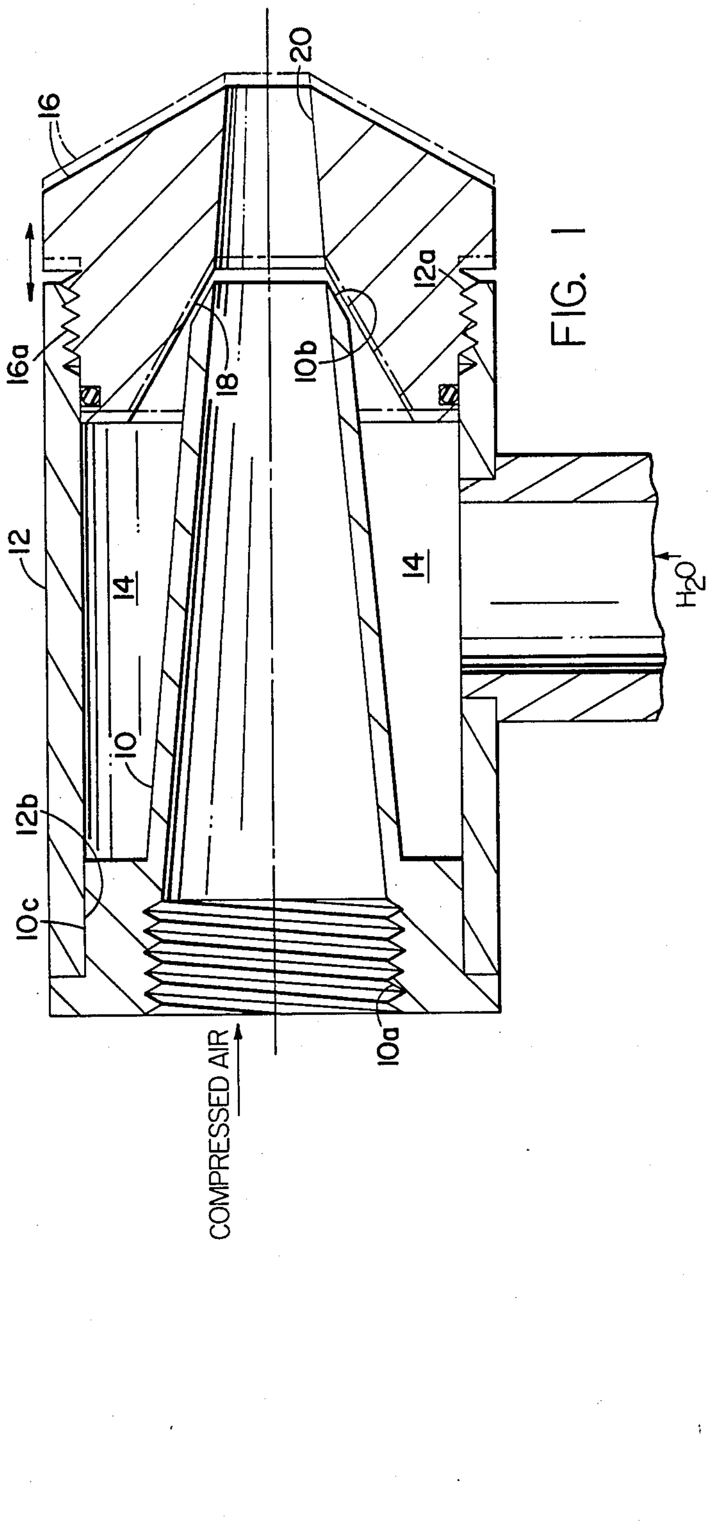

FIG. 1 is a cross sectional view of the nozzle structure of a perferred form of the present invention.

Figure 2:
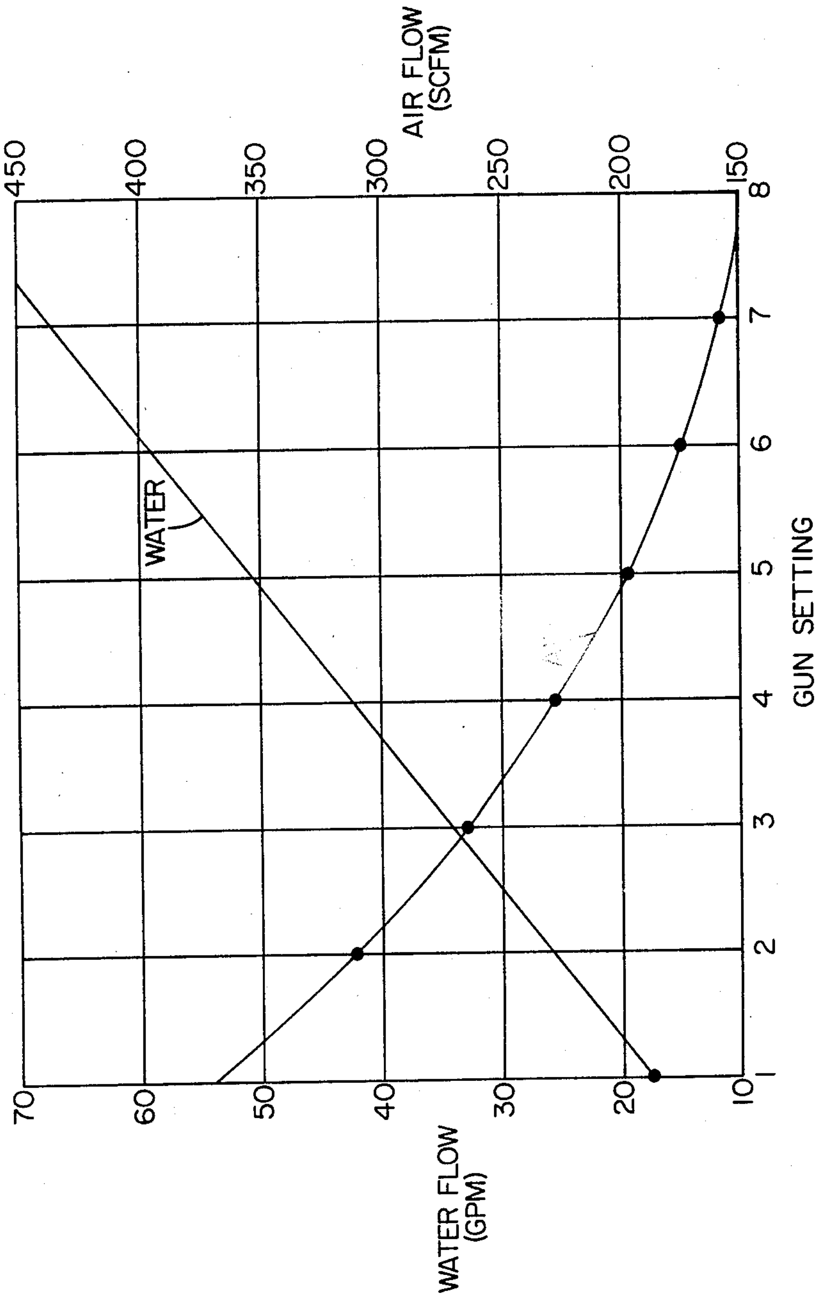

FIG. 2 presents graphically the variation achieved in water and air flows with variations in the size of the annular conically shaped opening provided for the water inside the nozzle structure itself at constant supply pressure for air and water.

Figure 3:
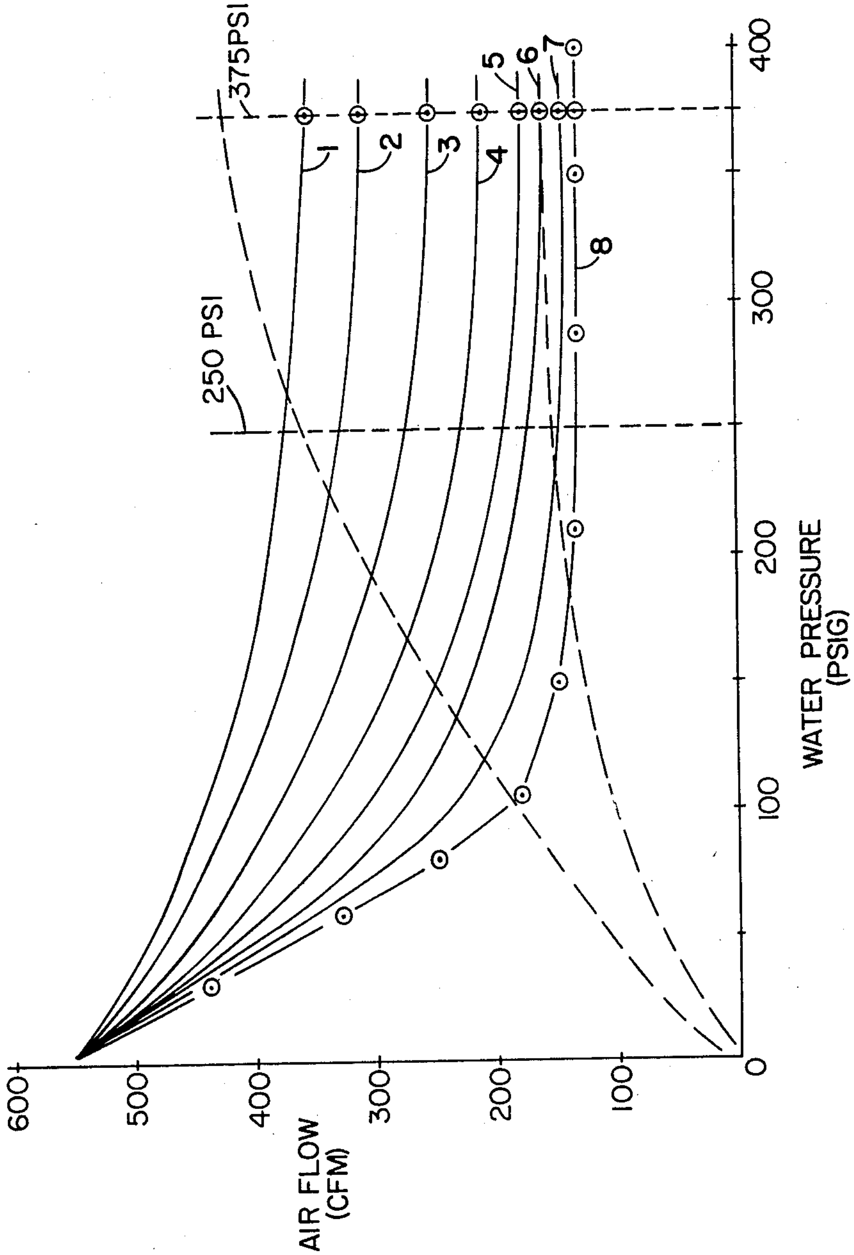

FIG. 3 shows the variation in air flow with increasing water pressure and flow at a particular water gap opening. Smaller water gaps will provide higher air flows and the general relationships can be seen in the family of curves presented.

Turning now to the drawings in greater detail, a preferred form of snow gun is illustrated in FIG. 1 as including an air nozzle defining member 10 that is preferably in the form of a body of revolution and which defines a longitudinally extending air passageway having a generally cylindrical inlet end portion 10*a* that is adapted for connection with a source of air under pressure. The nozzle member has a downstream end 10*b* that is inclined with respect to the longitudinal axis of its convergent central air passageway.

The air passageway is further defined by a cap 16 which cap defines an outlet end portion 20 of the air passageway that has an exit end of smaller cross sectional area than that of the above mentioned inlet end portion 10*a* of the nozzle member 10. The cap 16 further includes a generally conically shaped surface 18 at its upstream end that is inclined relative to the longitudinal axis of the nozzle structure at an angle in the range between 20 and 60 degrees, and preferably in the range between 30 and 45 degrees.

Means is provided for adjustably locating or positioning the outlet defining cap 16 relative to the convergent air nozzle member 10 in order to provide an opening between the downstream end 10*b* of the nozzle member 10 and the upstream end 18 of the cap 16. Preferably, said means for so adjusting said cap relative said nozzle member comprises an outer housing means or body 12 that also serves to define the annularly shaped water plenum chamber between it and the exterior of the nozzle member 10. Such plenum is indicated generally at 14 and is adapted to be connected to a source of water under relatively high pressure preferably in the range between 250 and 400 pounds per square inch gage. This outer housing means 12 includes a downstream portion that has an internal or female thread 12*a* adapted to threadably receive the portion 16*a* of the cap which is externally threaded and to provide for axial adjustment of the cap relative the nozzle member to achieve a predetermined spacing between the surfaces 18 and 10*b* of the cap and nozzle member respectively.

The upstream end portion of the housing or body 12 is preferably secured to the upstream end of the nozzle member 10 as indicated generally by the mating surfaces 12*b* and 10*c* of the body 12 and the nozzle member 10 respectively. The outer housing of body 12 is also preferably shaped in the form of a body of revolution in order to provide a generally cylindrical exterior for the snow gun and this body 12 includes a port of conventional configuration to receive a fitting (not shown) to facilitate attachment to the water conduit (also not shown) that provides the high pressure water to the plenum chamber 14 as mentioned previously.

As so constructed and arranged the nozzle structure is designed to form an annular sheet or cone of water delivered under pressure of at least 250 pounds per square inch gage and preferably on the order of 350 pounds per square inch gage to create a "water" nozzle for the air such that the air flow tends to remain relatively constant once this water pressure is reached. This is true even if the water pressure be further increased above 350 pounds per square inch gage in order to further increase the water flow. FIG. 2 illustrates the calibration curves for the water and air in a gun that has been connected to a source of water under pressure of 350 pounds per square inch gage and to a source of compressed air under pressure of 75 pounds per square inch. The calibration curve of FIG. 2 illustrates the fact that variations in the axial position of the cap relative to the nozzle member (that is varying the size of the water opening) leads to predictable changes in the gallons per minute of water. This is illustrated by the straight line relationship for the water flow in this view. FIG. 3 shows how the air flow can be reduced at a particular water gap opening simply by increasing water pressure, and hence water flow in gallons per minute.

The snow gun described and claimed herein provides a convenient structure for achieving predictable water and air flow mixtures in the hostile environment of winter ski slopes, and once such a gun has been properly adjusted it can be used to make snow at a specific water operating pressure and thereby efficiently control the quantity of air consumed in a manner that is vastly superior to that afforded by present day snow guns generally. The capability for fine tuning and adjusting the water/air mixture leads to more predictable results under predetermined atmospheric conditions. For example, and referring to the settings illustrated on the base line of FIG. 2, at temperatures slightly below freezing nozzles with a setting of 1 afford favorable air consumption rates in a system which nevertheless is capable of efficient snow making. Moreover, when the temperatures drop to the range of −5 to −20 degrees Celsius higher settings can be used affording the ski slope operator with the opportunity to make more snow than would be the case if the same gun should be used, that is, as defined by a snow gun with a setting of 1. In short, the ski slope operator can pre-set a number of guns to permit use of such guns under a wide variety of ambient conditions and thereby make snow with maximum efficiency (defined as minimal use of compressed air and maximum quantity of snow made) simply by reverting to the proper setting on the calibrated gun itself with preference to the data described above relating ambient temperature and humidity conditions to settings for the nozzle cap relative the fixed nozzle structure all as described above.

In practice a water gap between the nozzle member and cap is in the range of 0.020 inches to 0.200 inches has been found to provide satisfactory snow making in a nozzle having an exit end of approximately one inch or less in diameter.

The longitudinally extending air passageway defined by the convergent air nozzle member and the cap which is provided in longitudinally adjustable relationship thereto cooperate to define a passageway that is continuously convergent from the inlet to the exit end portion thereof.

I claim:

1. In a system for making snow from compressed air and water, an improved nozzle structure comprising means defining a longitudinally extending air passageway with a generally cylindrical inlet end portion adapted for connection with a source of air under pressure,

- said air passageway defining means including a cap defining an outlet end portion of said air passageway of smaller cross sectional area than that of said inlet end portion,
- said air passageway defining means further including a convergent air nozzle member intermediate said inlet and outlet end portions,
- said cap defined outlet end portion of said air passageway having a conical configuration that continues the convergent shape of said air nozzle member,
- means for locating/positioning said outlet defining cap longitudinally relative to said convergent air nozzle member to provide an opening between an upstream end of said outlet defining cap and a downstream end of said convergent nozzle member, and
- outer housing means defining a water plenum chamber communicating with said opening and adapted for communication with a source of water under pressure to restrict the effective area of the outlet end portion of said air passageway defined by said cap so that the air/water mixture can be closely controlled to optimize performance of the air/water nozzle structure in a wide variety of ambient temperature and humidity conditions.

2. The combination of claim 1 wherein said convergent nozzle member comprises a body of revolution defining a conically shaped convergent axial segment of said air passageway.

3. In combination of claim 2 wherein said housing means comprises a hollow cylindrical body member having a threaded portion that defines in part said means for so locating said cap relative to said nozzle member.

4. The combination of claim 3 wherein said opening has an annulary shape such that the water enters said air passageway in the shape of a conical sheet.

5. The combination of claim 4 wherein said annular shape of said opening is more particularly that of a conical segment forming an entry angle with the longitudinal axis of the air passageway in the range between 20–60 degrees.

6. The combination of claim 3 wherein said cap has a threaded portion that threadably engages said threaded portion of said cylindrical body member to provide said longitudinal positioning of said cap relative said nozzle member.

7. The combination of claim 6 wherein said opening has an annular shape such that the water enters said air passageway in the shape of a conical sheet.

8. The combination of claim 7 wherein said annular shape of said opening is more particularly that of a conical segment forming an entry angle with the longitudinal axis of the air passageway in the range between 20–60 degrees.

9. The combination of claim 8 wherein said cap defined outlet end portion of said air passageway has a conical configuration that is no greater in cross sectional size than the downstream end of said nozzle member.

10. The combination of claim 9 wherein the inlet end of said convergent air passageway defined by said nozzle member and the exit end of said cap have an area ratio of approximately 4:1.

11. The combination of claim 1 further characterized by a source of water under pressure, said water pressure being provided in a range between 250–400 pounds per square inch to said plenum chamber.

12. The combination of claim 11 wherein said convergent nozzle member comprises a body of revolution defining a conically shaped convergent axial segment of said air passageway.

13. The combination of claim 12 wherein said cap has a threaded portion that threadably engages said threaded portion of said cylindrical body member to provide said longitudinal positioning of said cap relative said nozzle member.

14. The combination of claim 13 wherein said opening has an annular shape such that the water enters said air passageway in the shape of a conical sheet.

15. The combination of claim 14 wherein said annular shape of said opening is more particularly that of a conical segment forming an entry angle with the longitudinal axis of the air passageway in the range between 20–60 degrees.

16. The combination of claim 15 wherein said convergent air passageway defined by said nozzle member and the exit end of said cap have an area ratio of approximately 4:1.

* * * * *